Figure 1:
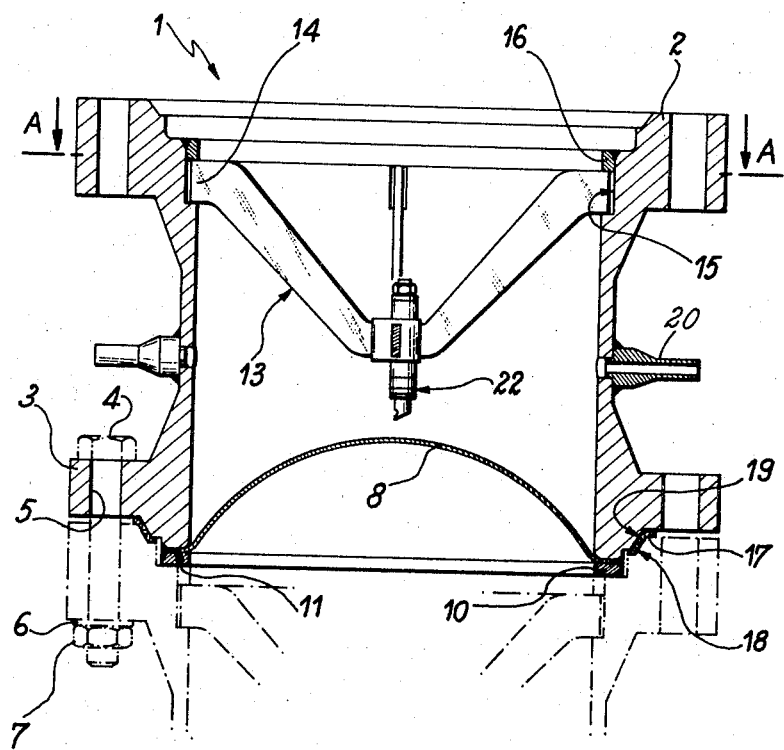

United States Patent [19]
Nedelec et al.

[11] 3,872,874
[45] Mar. 25, 1975

[54] SAFETY DEVICE FOR LIMITING THE PRESSURE OF A FLUID

[75] Inventors: Joseph Marie Nedelec, Voulx; Philippe Buffet, Melun; Alain Michel, Le Mee sur Seine, all of France

[73] Assignee: Electricite de France (Service National), Paris, France

[22] Filed: July 6, 1973

[21] Appl. No.: 376,944

[30] Foreign Application Priority Data
July 11, 1972 France .............................. 72.25130

[52] U.S. Cl. .................. 137/68, 30/366, 220/89 A
[51] Int. Cl. ............................................. F16k 17/40
[58] Field of Search .................................. 220/89 A; 137/68–71, 797

[56] References Cited
UNITED STATES PATENTS

| | | | |
|---|---|---|---|
| 2,707,398 | 5/1955 | Waite | 220/89 A X |
| 2,788,794 | 4/1957 | Holinger | 137/71 |
| 3,693,691 | 9/1972 | Summers | 137/68 X |
| 3,770,918 | 11/1973 | Fortmann | 137/68 X |

FOREIGN PATENTS OR APPLICATIONS

| | | | |
|---|---|---|---|
| 1,193,985 | 5/1959 | France | 220/89 A |
| 651,017 | 3/1951 | United Kingdom | 137/68 |

Primary Examiner—Martin P. Schwadron
Assistant Examiner—Richard Gerard
Attorney, Agent, or Firm—Cameron, Kerkam, Sutton, Stowell & Stowell

[57] ABSTRACT

The safety device comprises a hollow modular element which is open at both ends, a deformable diaphragm mounted as a shutter for closing-off one end of the element and having a convex face directed towards the interior of said element, an axial progressive-shearing cutter placed near the convex surface and secured to a removable structure which is mounted on the modular element at the end remote from the diaphragm, and sealing and coupling means at each end of the element.

5 Claims, 4 Drawing Figures

SAFETY DEVICE FOR LIMITING THE PRESSURE OF A FLUID

This invention relates to a safety device for limiting the pressure of a fluid to a predetermined value.

The safety systems of the bursting disc type can be considered as falling into two classes which are differentiated by the use of the diaphragm on the principle of either natural bursting or reversal.

Natural bursting diaphragms in the form of spherical caps are sometimes weakened locally. Diaphragms of this type work under internal pressure and fail when the stress attains the ultimate load value. By virtue of their basic principle, said diaphragms afford low creep resistance since the working stress to which they are subjected is necessarily high. Moreover, at the stage of manufacture, very stringent testing of the base laminate is necessary in order to prevent dispersion both in thickness and in ultimate load, consequently in the bursting pressure of the end product. Finally, diaphragms of this type do not offer any possibility of adjustment.

It is also possible to include in this category of apparatus those systems in which the pressure force is transmitted by any suitable mechanical means to an element (such as a shear pin, for example) which fails when the resultant applied stress attains the ultimate load value. In general, a system of this type is fitted with a diaphragm, the sole function of which is to ensure leak-tightness.

The reversing diaphragms are also of spherical shape but operate under external pressure. When the critical value of pressure is attained, the diaphragm buckles and is reversed. A cutter placed on the path of the diaphragm causes tearing of this latter. However, since the principle of this system is based on a phenomenon of instability, the cricital buckling pressure is a value which cannot be attained with precision by reason of the fact that the theoretical formulae are divergent. Moreover, any small differences of shape are liable to result in a high degree of dispersion and diaphragms of large size are sensitive to heterogeneities of thermal origin.

The invention is primarily directed to a novel device for overcoming the drawbacks mentioned above while retaining the advantages offered by diaphragms and additionally providing a possibility of adjustment of the initial tearing point.

The invention essentially consists in providing a device of modular design which is characterized in that it comprises in combination:
 a hollow modular element which is open at both ends,
 a preformed diaphragm mounted as a shutter for closing-off one end of the hollow element and having a convex surface directed towards the interior of said element,
 an axial progressive-shearing cutter placed in the proximity of said surface and secured to a removable structure which is mounted on another end of the hollow element,
 sealing and coupling means suited to each end of the modular element.

In a preferred embodiment of the invention, the diaphragm has a peripheral annular flange which is securely attached to a strengthening ring and to the corresponding end of the modular element.

In another embodiment of the invention, the cutter is ground with an oblique cutting face having a rake angle which determines a punctual cutting edge and a perimeter which produces a shearing action on the diaphragm along the periphery of said cutting edge as the tearing of the diaphragm takes place.

In order to facilitate the assembly and grinding of the cutter, the structure comprises radial arms inserted and locked by means of a strengthening ring in the internal wall of the modular element, a central hub which serves to join said arms together in order to accommodate the cutter.

In accordance with one proposed form of construction which is of particularly high strength for the assembly of the diaphragm, the strengthening ring and the corresponding end of the modular element are joined together by welding.

Grinding of the cutter and its progressive action on the diaphragm are facilitated by the fact that the cutter is a hollow cylinder which is open on the same side as the ground cutting edge.

Wear of the cutter and adjustment of this latter with respect to the diaphragm according to the internal pressure which is contemplated for the device are compensated by axial adjustment of the cutter. Position-feelers mounted inside the modular element serve to detect the stages of operation of the diaphragm.

Figure 2:
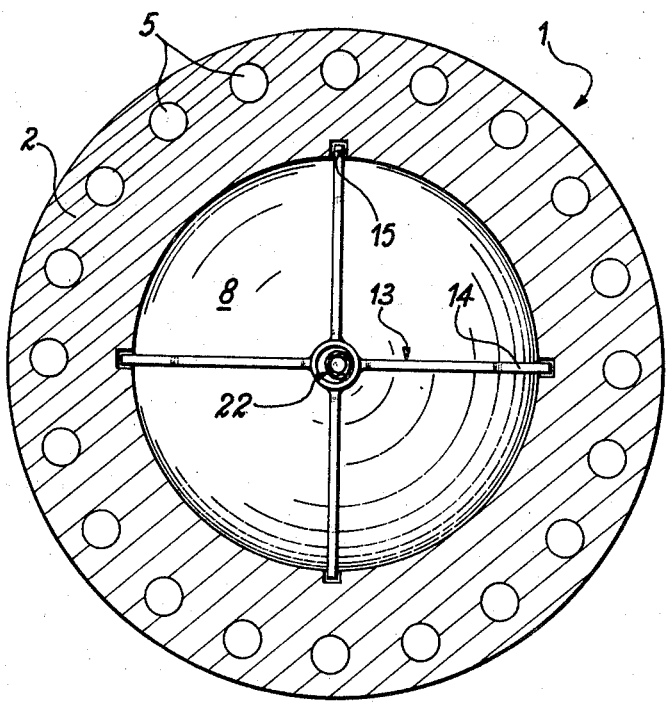
Figure 3:
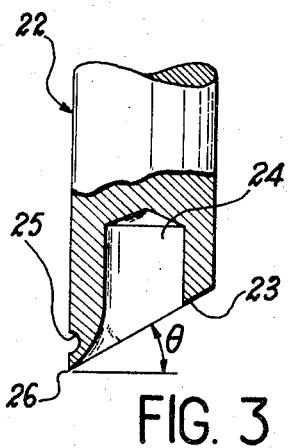
Figure 4:
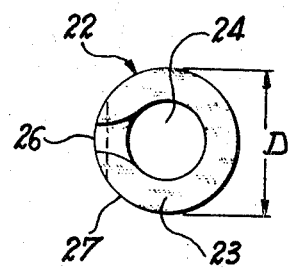

The following description relates to examples of construction which are described with reference to the accompanying drawings, wherein:

FIG. 1 is a view in sectional elevation of the device according to the invention;
 FIG. 2 is a plan sectional view taken along line A—A of FIG. 1;
 FIG. 3 is a view in elevation showing a cutter in accordance with the invention;
 FIG. 4 is a plan view of FIG. 3.

Each element 1 is of hollow construction, is preferably of cylindrical shape, and has flanged open ends, namely a female end 2 and a male end 3. Coupling means are provided between the flanges and in the present example are fitted with bolts 4 passed through holes 5 formed in the flanges, with safety washers 6 and with clamping nuts 7.

A diaphragm 8 in the form of a spherical segment or cap is obtained by hydraulic forming from a stainless steel blank having a thickness of 0.3 mm.

Said diaphragm has a peripheral annular flange which is welded at the same time against a strengthening ring 10 and against a shouldered portion 11 of the flange 3.

A cutter-holding structure 13 is provided with heel-shaped projections 14 fitted within grooves 15 of the flange 2.

A ring 16 which is welded to the flange 2 retains the heel-shaped projections 14 so as to obtain strict positioning of the cutter-holding structure 13.

A seal 17 placed between the joint planes 18 and 19 of the flanges 2 and 3 ensures standard leak-tightness with respect to the exterior.

As illustrated in FIGS. 1 and 2, the structure 13 places a cutter 22 at a predetermined distance from the diaphragm 8 and a control means provides the possibility of adjusting this distance to the required value. In the present example, the position of the cutter 22 is adjusted by means of a set of packing-pieces.

In the example of construction under consideration, the cutter 22 (shown in FIGS. 3 and 4) is of circular cross-section having a diameter D of 12 mm with a rake angle $\theta$ of 37.5°. The cutting face 23 is hollowed-out so as to form a bore 24 and a relieved portion 25 serves to reduce the thickness of the cutting edge 26.

The shape of the cutter which is similar to that of a horseshoe makes it possible by means of a punctual operation to form a cut for initiating a burst at a value of pressure which is very close to that at which the diaphragm 8 and the cutter 22 come into contact with each other.

The cutter thus serves to initiate the bursting of the diaphragm and its position is such as to establish the threshold of deformation above which bursting of the diaphragm takes place.

The operation of the device is as follows:

When the internal surface of the diaphragm is subjected to an accidental overpressure, said diaphragm undergoes deformation and comes into contact with the cutting edge 26 of the cutter 22.

As soon as the overpressure attains a sufficient value, a cut is started from the summit of the cutter and propagates rapidly on each side along the edge 27 of the cutting face 23 while the sheet metal "rises".

This process is similar to a shearing operation. Taking into account the shape selected for the cutter, the stress which is necessary for the cutting operation need be exerted only at points of application which are displaced as the work advances along the edge 27.

When the cutting operation has reached a given length, the overstrain at the edge of the cut exceeds the ultimate yield strength, thereby resulting in widening of the cut.

Since this process is divergent, free opening of the diaphragm is obtained. The cutting operation can be assisted by local portions of reduced thickness which are located in the line of extension of the cutter recess; these thinned portions are of small size in order to ensure that they do not themselves cause fracture.

Feeler devices which are passed through ducts 20 serve to follow the progressive variation of deformation of a diaphragm under conditions of service and thus to detect ageing as a result of creep deformation.

Mention can be made of one example of industrial application in the field of sodium-cooled fast reactors. In this application, the diaphragms are intended to protect the secondary sodium circuits against the effects of accidental overpressure resulting from a sodium-water reaction within a steam generator. For this application, the modular design of the apparatus makes it possible to instal two diaphragms in series in order to reduce the danger of accidental failure. Repair and adjustment of a module can be carried out in the workshop, thereby facilitating maintenance work.

We claim:

1. A safety device for limiting the pressure of a fluid within a vessel or duct to a predetermined value wherein said device comprises in combination:
   a hollow modular element which is open at both ends,
   a preformed spherical segment non-reversing metallic diaphragm mounted as a shutter for closing off one end of the hollow element and having a convex surface directed towards the interior of said element,
   an axial progressive-shearing cutter placed in the proximity of said surface and secured to a removable structure which is mounted on the other end of the hollow element,
   sealing and coupling means suited to each end of the modular element and said structure including radial arms locked by strengthening ring in the internal wall of the modular element and, a central hub joining said arms together and mounting said cutter.

2. A device according to claim 1, wherein the diaphragm has a peripheral annular flange which is securely attached to a strengthening ring and to the corresponding end of the modular element.

3. A device according to claim 2, wherein the annular flange of the diaphragm, the attached strengthening ring and the corresponding end of the modular element are joined together by welding.

4. A device according to claim 1, wherein the cutter has an oblique cutting face having a rake angle which determines a punctual cutting edge and a perimeter providing a shearing action on the diaphragm along the periphery of said cutting edge as the tearing of said diaphragm takes place, the cutter being a hollow cylinder open on the side of the cutting edge.

5. A device according to claim 4, wherein the distance between the punctual cutting edge of the cutter and the convex surface of the diaphragm is adjustable by means of an axial displacement of the cutter within the hub.

* * * * *